United States Patent
Bassow et al.

(10) Patent No.: US 10,084,566 B2
(45) Date of Patent: Sep. 25, 2018

(54) ENODEB WITH MASKING FUNCTIONALITY AND AIRCRAFT

(71) Applicant: AIRBUS OPERATIONS GMBH, Hamburg (DE)

(72) Inventors: Erhard Bassow, Hamburg (DE); Roberto Lambiase, Milan (IT)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 15/718,488

(22) Filed: Sep. 28, 2017

(65) Prior Publication Data

US 2018/0091253 A1 Mar. 29, 2018

Related U.S. Application Data

(63) Continuation-in-part of application No. 15/190,857, filed on Jun. 23, 2016.

(30) Foreign Application Priority Data

Jun. 24, 2015 (EP) ..................... 15173575

(51) Int. Cl.
*H04K 3/00* (2006.01)
*H04J 13/00* (2011.01)
(Continued)

(52) U.S. Cl.
CPC ............ *H04K 3/86* (2013.01); *H04J 13/0062* (2013.01); *H04J 13/14* (2013.01); *H04K 3/84* (2013.01); *H04W 84/06* (2013.01); *H04W 88/08* (2013.01)

(58) Field of Classification Search
None
See application file for complete search history.

(56) References Cited

U.S. PATENT DOCUMENTS 9,923,662 B2 3/2018 Bassow et al.
2011/0211489 A1 9/2011 Chung et al.
(Continued)

FOREIGN PATENT DOCUMENTS

DE 102011079972 A1 1/2013
DE 102011119892 A1 5/2013

OTHER PUBLICATIONS

"CAZAC sequence and its application in LTE random access", Wen et al., Proceedings of 2006 IEEE Information Theory Workshop.*
(Continued)

*Primary Examiner* — Raymond Dean
(74) *Attorney, Agent, or Firm* — Jenkins, Wilson, Taylor & Hunt, P.A.

(57) ABSTRACT

A method for masking communication signals, particularly for masking terrestrial RF communication signals on board of an aircraft, includes parallelizing a first information data stream to be transmitted on a first LTE transmission channel. The first LTE transmission channel has a first channel transmission bandwidth and at least one guard band adjacent to the channel transmission bandwidth. The first information data stream is spread over mutually orthogonal data subcarriers within the first channel transmission bandwidth. A CAZAC sequence is generated. The generated CAZAC sequence is spread over guard band subcarriers within the at least one guard band. The first information data stream is transmitted over the data subcarriers in parallel to the CAZAC sequence over the guard band subcarriers.

8 Claims, 2 Drawing Sheets

(51) Int. Cl.
*H04J 13/14* (2011.01)
*H04W 84/06* (2009.01)
*H04W 88/08* (2009.01)

(56) References Cited

U.S. PATENT DOCUMENTS

2014/0198760 A1 7/2014 Meyrath
2014/0206279 A1 7/2014 Immendorf et al.
2014/0364053 A1 12/2014 Schirrmacher
2015/0092742 A1 4/2015 Han et al.
2016/0380719 A1 12/2016 Bassow et al.

OTHER PUBLICATIONS

Wen et al., "CAZAC sequence and its application in LTE random access," in Proc. 2006 IEEE Information Theory Workshop, pp. 544-547 (2006).

Non-Final Office Action for U.S. Appl. No. 15/190,857 dated Apr. 12, 2017.
Non-Final Office Action for U.S. Appl. No. 15/190,857 dated May 5, 2017.
Notice of Allowance for U.S. Appl. No. 15/190,857 dated Aug. 29, 2017.
LG Electronics: "Details on PRS Sequence," 3GPP Draft; R1-092483_LG_PRS_SEQUENCE, 3rd Generation Partnership Project (3GPP), Mobile Competence Centre; 650, Route Des Lucioles; F-06921 Sophia-Antipolis Cedex; France, No. Los Angeles, USA; 20090624, XP050350991, pp. 1-6 (2009).
Extended European Search Report for Application No. 15173575 dated Dec. 15, 2015.
Supplemental Notice of Allowance and Interview Summary for U.S. Appl. No. 15/190,857 dated Oct. 5, 2017.
Notice of Allowance for U.S. Appl. No. 15/190,857 dated Dec. 4, 2017.

* cited by examiner

ENODEB WITH MASKING FUNCTIONALITY AND AIRCRAFT

CROSS-REFERENCE TO RELATED APPLICATION

This application is a continuation-in-part of and claims priority to U.S. patent application Ser. No. 15/190,857 filed Jun. 23, 2016, which claims the benefit of and priority to EP 15 173575.0 filed Jun. 24, 2015, the entire disclosures of which are herein incorporated by reference.

TECHNICAL FIELD

The present disclosure relates to a method for masking mobile communication signals, particularly on board of aircraft or other moving airborne vehicles. The present disclosure further relates to an eNodeB with masking functionality for masking terrestrial mobile communication signals, specifically on board of aircraft or other moving airborne vehicles.

BACKGROUND

Currently, passengers in aircraft need to deactivate their mobile RF communication devices at least during take-off and landing. Mobile RF devices try to maintain connectivity to terrestrial cellular networks on the ground. Due to the high speed of the aircraft and the increasing altitude, large path losses, high fading and delay interference may occur forcing the internal transceivers in the mobile devices to operate at full power. Apart from RF interference issues with electronic equipment on board of the aircraft, frequent base station handovers and cell roaming would cause terrestrial network disturbances.

Usually, on-board ground network suppressors (OBCEs) are employed in aircraft to jam or block all mobile RF communication signals from terrestrial network stations above a flight height of 3 kilometers.

Document US 2011/0211489 discloses a communication method in an LTE multi-carrier system, in which radio resources for transmitting signals to a middle guard band are allocated and transmitted through the radio resources. The middle guard band is a frequency band positioned between used bands of a plurality of carriers of an aggregated carrier. This middle guard band between the carriers is used to improve channel estimation performance or to increase efficiency of radio resources.

Document DE 10 2011 119 892 A1 discloses a method of controlling a mobile communication network on board of an aircraft including combining an LTE service signal in a first frequency band with a masking signal in a second frequency band to suppress reception of terrestrial mobile communication signals in both frequency bands.

Document DE 10 2011 079 972 A1 discloses a communication method on board of aircraft which uses a masking signal to both disrupt mobile communication with terrestrial communication base stations as well as convey information items to onboard media equipment within the masking signal.

SUMMARY

One idea of the disclosure herein is therefore to provide improved solutions for masking mobile communication signals within an airborne vehicle while at the same time providing dedicated mobile communication for passengers of the airborne vehicle. Particularly, one object of the disclosure herein is to avoid having to provide separate masking signal generators on board of the airborne vehicle.

A first aspect of the disclosure herein pertains to a method for masking communication signals, comprising parallelizing a first information data stream to be transmitted on a first LTE transmission channel, the first LTE transmission channel having a first channel transmission bandwidth and at least one guard band adjacent to the channel transmission bandwidth; spreading the first information data stream over a plurality of mutually orthogonal data subcarriers within the first channel transmission bandwidth; generating a CAZAC sequence; spreading the generated CAZAC sequence over guard band subcarriers within the at least one guard band; and transmitting the first information data stream over the data subcarriers in parallel to the CAZAC sequence over the guard band subcarriers.

According to a second aspect of the disclosure herein, an eNodeB comprises a mapping device configured to map a first information data stream to be transmitted on a first LTE transmission channel, the first LTE transmission channel having a first channel transmission bandwidth and at least one guard band adjacent to the channel transmission bandwidth, and configured to spread the first information data stream over a plurality of mutually orthogonal data subcarriers within the first channel transmission bandwidth; a random sequence generator configured to generate a CAZAC sequence; a guard band subcarrier controller configured to spread the CAZAC sequence generated by the random sequence generator over guard band subcarriers within the at least one guard band; and an RF transmitting system configured to transmit the first information data stream over the data subcarriers in parallel to the CAZAC sequence over the guard band subcarriers.

According to a third aspect of the disclosure herein, an E-UTRAN comprises at least two eNodeBs. A first one of the at least two eNodeBs includes a mapping device configured to map a first information data stream to be transmitted on a first LTE transmission channel, the first LTE transmission channel having a first channel transmission bandwidth and at least one guard band adjacent to the channel transmission bandwidth, and configured to spread the first information data stream over a plurality of mutually orthogonal data subcarriers within the first channel transmission bandwidth; a random sequence generator configured to generate a CAZAC sequence; a guard band subcarrier controller configured to spread the CAZAC sequence generated by the random sequence generator over guard band subcarriers within the at least one guard band; and an RF transmitting system configured to transmit the first information data stream over the data subcarriers in parallel to the CAZAC sequence over the guard band subcarriers. A second one of the at least two eNodeBs includes a mapping device configured to map a second information data stream to be transmitted on a second LTE transmission channel, the second LTE transmission channel having a second channel transmission bandwidth and at least one guard band adjacent to the channel transmission bandwidth, and configured to spread the second information data stream over a plurality of mutually orthogonal data subcarriers within the second channel transmission bandwidth; a random sequence generator configured to generate a CAZAC sequence; a guard band subcarrier controller configured to spread the CAZAC sequence generated by the random sequence generator over guard band subcarriers within the at least one guard band; and an RF transmitting system configured to transmit the second information data stream over the data subcarriers in parallel to the CAZAC sequence over the guard band subcarriers. The first and second guard bands are located in a frequency gap between the first and second channel transmission bandwidth.

According to a fourth aspect of the disclosure herein, an E-UTRAN according to the third aspect of the disclosure herein is used in an airborne vehicle for masking terrestrial communication signals within the airborne vehicle.

According to a fifth aspect of the disclosure herein, an airborne vehicle comprises at least one eNodeB according to the second aspect of the disclosure herein.

The idea on which the present disclosure is based is to have an eNodeB on board of an aircraft that provides LTE communication and, at the same time, ensures that other communication signals are fully blocked or jammed over the whole channel bandwidth of the LTE communication channel. Several adjacent LTE channels may be pulled together to cover the same bandwidth that an ordinary OBCE would have covered in order to mask terrestrial GSM signals. This eNodeB provides LTE service and masking in equal measure this specifically prepared LTE signal. Moreover 2G services may be offered in parallel to LTE when suitable GSM carriers are positioned along the LTE frequency band.

According to an embodiment of the method, the CAZAC sequence may comprise a Zadoff-Chu sequence. Zadoff-Chu sequences are advantageously used to achieve an autocorrelation value that is very close to ideal white noise.

According to a further embodiment of the method, generating the CAZAC sequence may comprise including pilot channel information, sensor control information and/or device status parameter information in the generated CAZAC sequence. In this way, the open frequencies of the lateral guard bands may be efficiently used for transmitting other information than LTE transmission related information, such as for example sensor data, control information for equipment in the aircraft or device status parameter information for example of the in-flight entertainment (IFE) system or other systems within the aircraft. Additionally, the lateral guard bands may be used for transmission of further pilot channel information, thus enhancing the stability and quality of the LTE communication link between the eNodeB and user equipment (UE) accessing the eNodeB.

According to another embodiment of the method, the method may further comprise determining currently unused subcarriers of the plurality of mutually orthogonal data subcarriers and spreading the generated CAZAC sequence over the determined currently unused subcarriers. This has the advantage that the LTE transmission channel is continuously filled with white noise, thus further improving the jamming or blocking capabilities for terrestrial RF communication signals, even in the small frequency gaps of currently unused subcarriers in between subcarriers currently being used for LTE transmission.

According to another embodiment of the method, the method may further comprise: parallelizing a second information data stream to be transmitted on a second LTE transmission channel, the second LTE transmission channel having a second channel transmission bandwidth and at least one second guard band adjacent to the second channel transmission bandwidth; spreading the second information data stream over a plurality of mutually orthogonal data subcarriers within the second channel transmission bandwidth; and spreading the generated CAZAC sequence over guard band subcarriers within the at least one second guard band, wherein the first and second guard band are located in a frequency gap between the first and second channel transmission bandwidth. This advantageously eliminates frequency gaps between adjacent or contiguous LTE transmission channels without the need for moving the center frequencies of either one of the first and second LTE transmission channel. Therefore, the LTE transmission channels may remain at the conventionally allocated frequency bands.

Advantageously, the method for filling up unused bands does not require any installation of specifically dedicated hardware, so that weight is reduced and power consumption lowered. Particularly an implementation as a software modification allows for very good cost efficiency.

According to further embodiment of the method, the method may further comprise refreshing the CAZAC sequence for each transmission time interval, TTI, of the LTE transmission. The more the same CAZAC sequence would be used over time, the less the whiteness of the resulting transmission signal. By refreshing the CAZAC sequences after each TTI, the whiteness of the masking signal may be retained, without excessive demand of computational power for generating the CAZAC sequences.

A computer-readable medium according to a further aspect of the disclosure herein may comprise computer-executable instructions which, when executed on a data processing apparatus, cause the data processing apparatus to perform the method according to the disclosure herein.

According to an embodiment of the eNodeB, the random sequence generator may be configured to generate the CAZAC sequence as a Zadoff-Chu sequence.

According to a further embodiment of the eNodeB, the guard band subcarrier controller may further be configured to include pilot channel information, sensor control information, device status parameter information and/or signals for component control and monitoring in the generated CAZAC sequence.

According to a further embodiment of the eNodeB, the eNodeB may further comprise an in-band subcarrier controller which is configured to determine currently unused subcarriers of the plurality of mutually orthogonal data subcarriers and further configured to spread the CAZAC sequence generated by the random sequence generator over the determined currently unused subcarriers. This advantageously opens up possibilities for preventing loss of transmission capacity of the LTE channel when GSM carriers are placed within the region of the former LTE guard bands since those guard bands are filled with CAZAC sequences.

According to a further embodiment of the eNodeB, the random sequence generator may further be configured to refresh the CAZAC sequence for each transmission time interval, TTI, of the LTE transmission.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
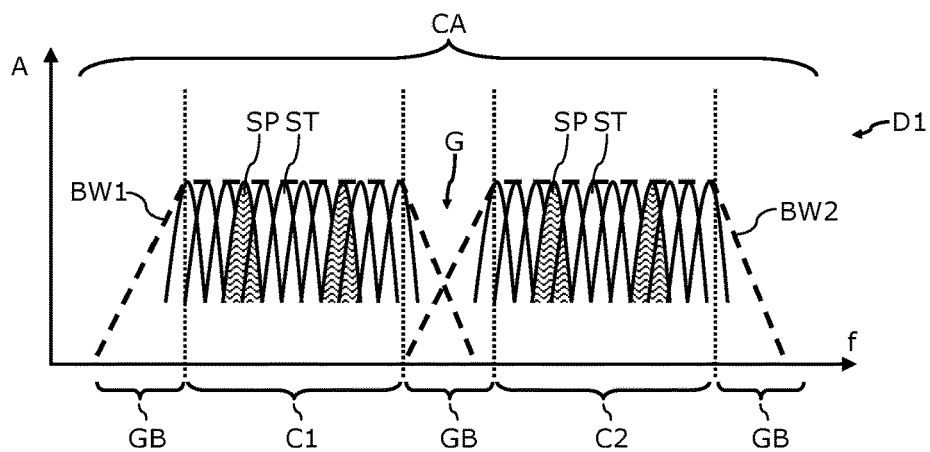
FIG. 1 schematically illustrates an exemplary diagram for the spectral distribution of subcarriers in adjacent LTE channels.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Figure 2:
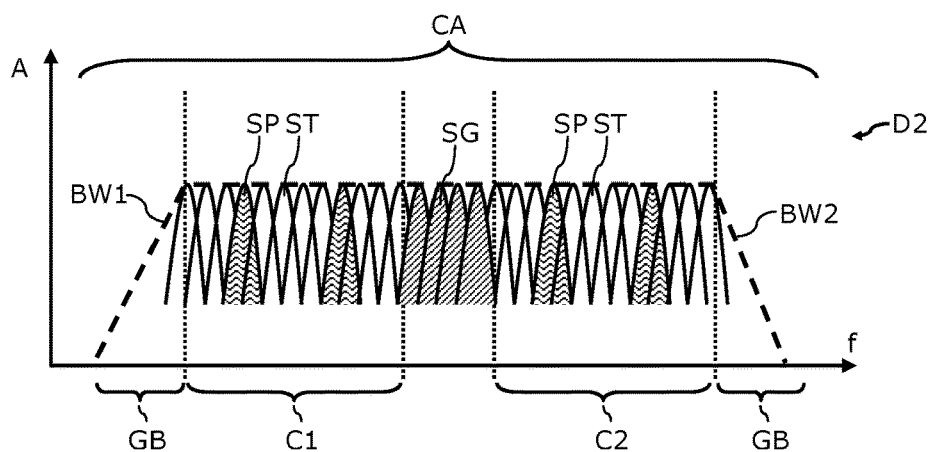
FIG. 2 schematically illustrates another exemplary diagram for the spectral distribution of subcarriers in adjacent LTE channels according to an embodiment of the disclosure herein.

FIGS. 1 and 2 illustrate a general concept of the disclosure herein: FIG. 1 schematically illustrates a spectral distribution D1 of the transmission amplitude A of two adjacent LTE channels over the frequency f. The two depicted LTE channels may for example be LTE channels in the Band 3 at around 1800 MHz or in the Band 20 at around 800 MHz However, it should be noted that other frequency range may equally be possible. The LTE channel carriers generally have a channel transmission bandwidth C1 and C2 which is flanked by guard bands GB, i.e. the guard bands GB occupy frequency ranges adjacent to the frequency ranges of the channel transmission bandwidths C1 and C2. The amplitude envelopes of the LTE channel carriers are generally denoted as channel bandwidths BW1 and BW2.

In the spectral range of the channel transmission bandwidths C1 and C2, the LTE signal may be of such high amplitude that other communication signals, particularly RF communication signals of terrestrial networks, may be effectively masked, i.e. jammed or blocked. For example, GSM frequencies within the channel transmission bandwidths C1 and C2 may be masked by the LTE transmission signals.

In the frequency ranges of the guard bands GB, however, the slew rate of the LTE signals is very high. Therefore, a superposition of two contiguous LTE channel carriers which are spectrally offset by an intermediate guard band GB will leave a masking gap G in which gap the overall amplitude of the LTE transmission signals from either of the LTE channels will be generally lower. Thus, RF communication signals of terrestrial networks may not be blocked or jammed as effectively in such masking gaps. LTE transmission channels with aggregated carriers CA that are separated by guard bands GB may therefore not have adequate masking capabilities for RF communication signals of terrestrial networks without introducing further measures to cover up the spectral "holes".

FIG. 2 schematically illustrates a spectral distribution D2 of the transmission amplitude A of two adjacent LTE channels over the frequency f where the masking gap G of FIG. 1 has been eliminated. In order to eliminate the masking gap G the guard band between contiguous LTE carriers has been filled up with guard band subcarriers SG having the same spacing and bandwidth as the subcarriers within the channel transmission bandwidths C1 and C2, such as the payload subcarriers ST and the pilot channel subcarriers SP. The guard band subcarriers SG are filled up with filler bits in the physical layer of an eNodeB responsible for servicing the aggregated LTE carrier CA. The guard band subcarriers SG may for this purpose be used for transmitting a CAZAC (constant amplitude zero autocorrelation) sequence, such as for example a Zadoff-Chu sequence. Such CAZAC sequences are substantially indistinguishable from white noise which may be used to effectively block or jam any underlying RF communication signal in that frequency range.

If needed or desired, additional pilot channel information, sensor control information and/or device status parameter information may be included in the generated CAZAC sequence. This way, information unrelated to the LTE transmission may be transmitted in the frequency range of the guard band subcarriers SG for example RF control and data signals for in-flight entertainment (FE) systems of an aircraft or other electronic equipment in the aircraft.

Figure 3:
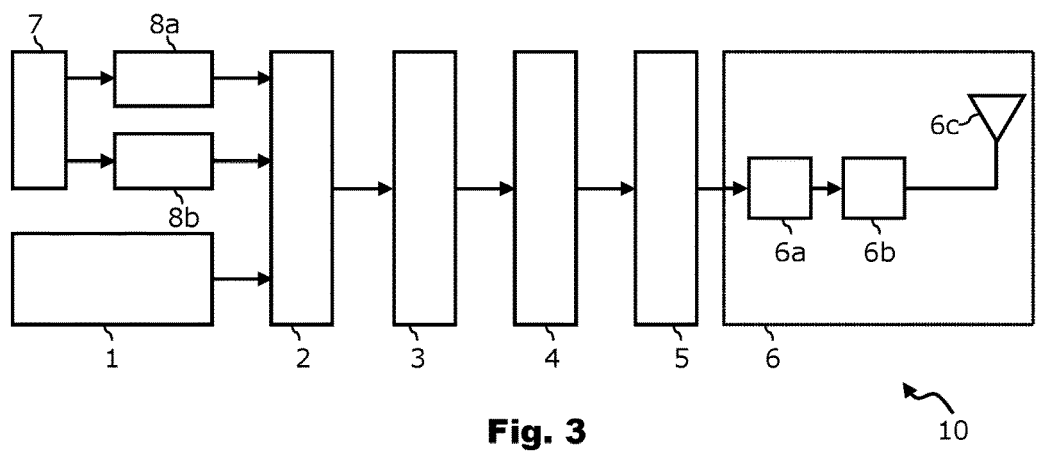
FIG. 3 schematically illustrates a functional block diagram of an eNodeB according to another embodiment of the disclosure herein.

FIG. 3 schematically illustrates the architecture of an eNodeB 10 that may be used on board of an aircraft to provision LTE communication on one hand and to mask RF communication signals of terrestrial networks on the other hand. The eNodeB 10 comprises a coding device 1 that receives an information data stream and performs channel coding on the set of information bits of the information data stream, for example such as a low-density parity check (LDPC) coding or turbo coding. The coding device 1 may further modulate the coded bits with an appropriate modulation scheme, such as Quadrature Phase Shift Keying (QPSK) or Quadrature Amplitude Modulation (QAM). This way, the coding device 1 outputs a series of modulation symbols in the frequency domain. Even prior to coding, other procedures that have not been explicitly depicted, such as CRC coding, code block segmentation or antenna mapping for MMO applications, may be performed on the information data stream.

Downstream of the coding device 1, a mapping device 2 parallelizes the sequence of modulated symbols to a number of parallel symbol data streams and maps them to a number of payload subcarriers. In other words, the information in the symbol data streams is spread over a plurality of mutually orthogonal data subcarriers.

The output of the coding device 1, i.e. the appropriate modulated data symbols, are mapped to a subset of subcarriers in a process called subcarrier mapping. The subcarrier mapping assigns output complex values as the amplitudes of some of the selected subcarriers. Subcarrier mapping as performed by the mapping device 2 can be classified into two types: localized mapping and distributed mapping. In localized mapping, the outputs of the coding device 1 are mapped to a subset of consecutive subcarriers thereby confining them to only a fraction of the system bandwidth. In distributed mapping, the outputs of the coding device 1 are assigned to subcarriers over the entire bandwidth noncontinuously, resulting in zero amplitude for the remaining subcarriers with regard to the data items.

The mapping device 2 further assigns the outputs of the guard band subcarrier controller 8b and the in-band subcarrier controller 8a to the remaining subcarriers with zero amplitude from the outputs of the coding device 1. The mapping device 2 maps each of the outputs of the coding device 1 to one of the M orthogonal subcarriers that can be transmitted. As in OFDMA, a typical value of M is 256 subcarriers and N=M/Q is an integer sub multiple of M. Q is the bandwidth expansion factor of the symbol sequence. If all terminals transmit N symbols per block, the system can handle Q simultaneous transmissions without co-chanel interference. The result of the subcarrier mapping is the set ˜X I (I=0, 1, 2 . . . M−1) of complex subcarrier amplitudes, where N of the amplitudes are non-zero from data symbols only.

The mapping device 2 may be implemented using pure software implementations on General Purpose Processors (GPP) or Digital Signal Processors (DSP) or pure hardware implementations on Application Specific Integrated Circuitry (ASIC) or Field-Programmable Gate Arrays (FPGA) or any combination thereof. For example, it may be possible to combine one or more GPPs with one or more ASICs to implement the mapping device 2. As another example, it may be possible to combine one or more GPPs with one or more FPGAs to implement the mapping device 2. As another example, it may be possible to combine one or more DSPs with one or more FPGAs to implement the mapping device 2. As another example, it may be possible to combine one or more DSPs with one or more ASICs to implement the mapping device 2. As another example, it may be possible to combine one or more GPPs and one or more DSPs with one or more FPGAs to implement the mapping device 2. As another example, it may be possible to combine one or more GPPs and one or more DSPs with one or more ASICs to implement the mapping device 2. As another example, it may be possible to combine one or more GPPs with one or more FPGAs and one or more ASICs to implement the mapping device 2. As another example, it may be possible to combine one or more DSPs with one or more FPGAs and one or more ASICs to implement the mapping device 2.

Field Programmable Gate Arrays (FPGAs), for example, are digital integrated Circuits (ICs) that could be seen as a two dimensional array of programmable logic blocks, which are connected through programmable interconnects. Each logic block, in the simplest form, may be a Look-Up Table (LUT), which can be used to implement Boolean functions. The internal logic blocks are connected to the outside world through a number of I/O blocks. These FPGAs are categorized as fine-grained FPGAs. However, larger and more complex algorithms required the introduction of coarsegrained FPGAs that include specific blocks such as: embedded block RAM, multipliers and Multiply-end-Accumulate (MAC) blocks. FPGA logic blocks may be grouped in a hierarchical order. Each of the logic blocks, sometimes referred to as Logic Cells (LCs), may be based on using an LUT; a multiplexer and a flip-flop.

The parallelized symbol data streams are then output to a transformation device 3 downstream of the mapping device 2 which is configured to perform an Inverse Fast Fourier Transformation (IFFT) on the parallel symbol data streams to generate time-domain output signals. In each of the time-domain output signals, a cyclic prefix insertion device 4 downstream of the transformation device 3 includes cyclic prefixes for symbol spacing.

Optionally, the eNodeB may further comprise a pulse shaping device 5 downstream of the cyclic prefix insertion device 4 to digitally up-convert the time-domain output signals, for example using root raised cosine roll off pulse shaping filters or Gaussian Minimum Shift Keying (GMSK) filters. After pulse shaping, the transmission signals enter the (analog) RF transmitting system which includes a digital-to analog converter 6a at its input, a mixer and an amplifier 6b and finally one or more transmission antennae 6c for transmission of the LTE transmission signals via a wireless channel.

The eNodeB further comprises a random sequence generator 7 that is configured to generate a CAZAC sequence, such as a Zadoff-Chu sequence. The CAZAC sequence may be refreshed in periodic intervals, such as for example every transmission time interval (TTI) of the LTE transmission. The generated CAZAC sequence may be input to a guard band subcarrier controller 8b which is configured to spread the CAZAC sequence over guard band subcarriers SG within a guard band GB of the LTE transmission carrier. The generated CAZAC sequence may additionally be input to an in-band subcarrier controller 8a which is configured to spread the CAZAC sequence over currently unused payload subcarriers ST within the transmission channel bandwidth of the LTE transmission carrier.

The mapping device 2 receives the output of the guard band subcarrier controller 8b and the in-band subcarrier controller 8a and includes the now filled up guard band subcarriers and the currently (for payload) unused subcarriers into the symbol mapping. The RF transmitting system 6 may in this way transmit the information data stream over the used data subcarriers ST in parallel to the CAZAC sequence over the guard band subcarriers SG and, potentially, over the currently (for payload) unused subcarriers.

The guard band subcarrier controller 8b may additionally include pilot channel information, sensor control information and/or device status parameter information in the generated CAZAC sequence.

An E-UTRAN for use on board of aircraft, particularly in order to provide LTE service and at the same time jam unwanted terrestrial network communication signals effectively, may use two or more of the eNodeBs 10 as shown in FIG. 3, one for each LTE transmission channel. The LTE transmission channel may be aggregated into a single aggregated carrier, but may also simply be two independent LTE cells. The LTE transmission channels of the different eNodeBs 10 may be non-contiguous or contiguous. In case of contiguous LTE transmission channels, the E-UTRAN may in particular be used to fill up the guard bands GB of both LTE transmission channels which are located in a frequency gap G between the first and second channel transmission bandwidth C1, C2 of the LTE cells.

Figure 4:
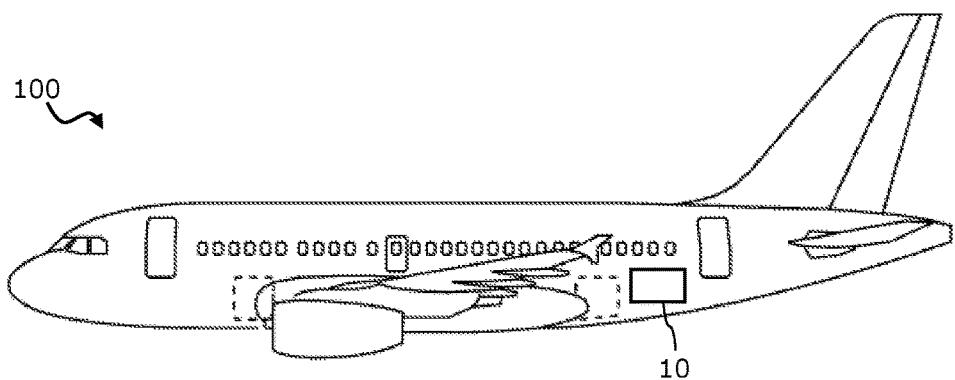
FIG. 4 schematically illustrates an airborne vehicle having an eNodeB according to a further embodiment of the disclosure herein.

FIG. 4 schematically illustrates an airborne vehicle 100 having at least one eNodeB 10 on board, such as for example the eNodeB 10 as described and explained in conjunction with FIGS. 1 through 3. The eNodeB 10 within the airborne vehicle 100 may be part of an onboard E-UTRAN for the airborne vehicle 100. Specifically, the onboard E-UTRAN may comprise at least two eNodeBs 10, each configured to provide service for an LTE cell. The LTE cells serviced by the at least two eNodeBs 10 may in particular be intraband LTE cells and may be contiguous with respect to each other.

Figure 5:
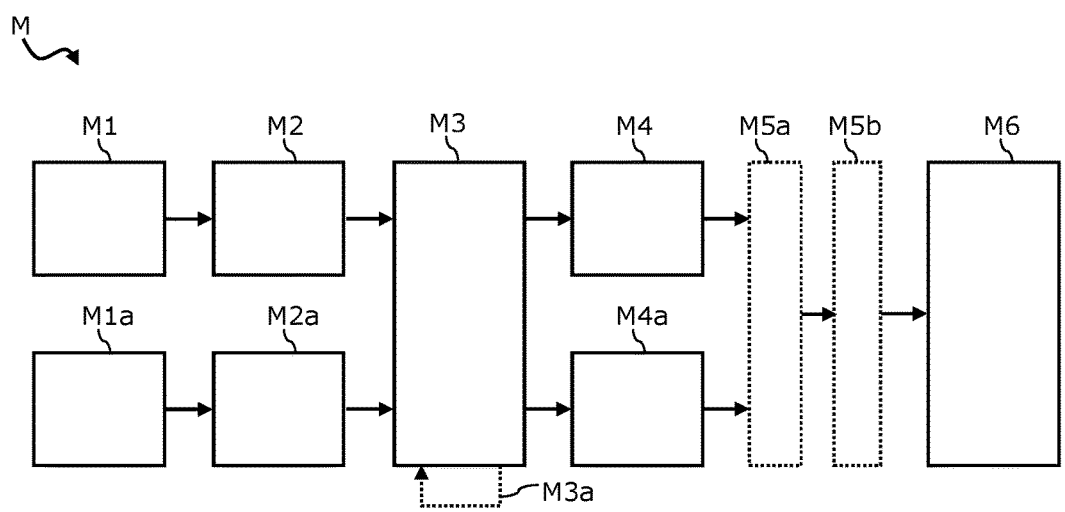
FIG. 5 schematically illustrates a flow diagram of a method for masking communication signals according to yet another embodiment of the disclosure herein.

FIG. 5 shows a schematic illustration of a flow diagram of a method M for masking a communication signal. The method M may for example make use of an eNodeB, such as the eNodeB 10 in FIG. 3, and may particularly be employed for masking terrestrial mobile communication signals in an airborne vehicle, such as for example the aircraft 100 in FIG. 4.

At M1, the method M involves parallelizing a first information data stream to be transmitted on a first LTE transmission channel, the first LTE transmission channel having a first channel transmission bandwidth C1 and at least one guard band GB adjacent to the channel transmission bandwidth C1. In a step M2, the first information data stream is spread over a plurality of mutually orthogonal data subcarriers ST within the first channel transmission bandwidth C1.

Parallel to the steps M1 and M2, the steps M1a and M2a may involve the same procedure for a second eNodeB servicing a second LTE transmission channel which is different from the first LTE transmission channel.

In a step M3, a CAZAC sequence is generated, for example a Zadoff-Chu sequence. The generated sequence may be enriched with pilot channel information, sensor control information and/or device status parameter information. The CAZAC sequence may additionally be refreshed (as indicated with arrow M3a) periodically, for example after each transmission time interval, TTI, of the LTE transmission.

In step M4, the generated CAZAC sequence is then spread over guard band subcarriers SG within the at least one guard band GB. Optionally, currently unused subcarriers ST of the plurality of mutually orthogonal data subcarriers ST may be detected in step M5a, so that the generated CAZAC sequence may also be spread over those currently unused subcarriers ST in step M5b. Currently unused subcarriers ST in this context may in particular be subcarriers that would not carry any payload in the current transmission cycle.

Finally, the first information data stream is transmitted in step M6 over the data subcarriers ST in parallel to the CAZAC sequence over the guard band subcarriers SG The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An eNodeB, comprising:
   a mapping device configured to map a first information data stream to be transmitted on a first LTE transmission channel, the first LTE transmission channel having a first channel transmission bandwidth and at least one guard band adjacent to the channel transmission bandwidth, and configured to spread the first information data stream over a plurality of mutually orthogonal data subcarriers within the first channel transmission bandwidth;
   a random sequence generator configured to generate a constant amplitude zero autocorrelation (CAZAC) sequence;
   a guard band subcarrier controller configured to spread the CAZAC sequence generated by the random sequence generator over guard band subcarriers within the at least one guard band; and
   an RF transmitting system configured to transmit the first information data stream over the data subcarriers in parallel to the CAZAC sequence over the guard band subcarriers.

2. The eNodeB according to claim 1, wherein the random sequence generator configured to generate the CAZAC sequence as a Zadoff-Chu sequence.

3. The eNodeB according to claim 1, wherein the guard band subcarrier controller is further configured to include pilot channel information, sensor control information, device status parameter information and/or signals for component control and monitoring in the generated CAZAC sequence.

4. The eNodeB according to claim 1, further comprising:
   an in-band subcarrier controller configured to determine currently unused subcarriers of the plurality of mutually orthogonal data subcarriers and further configured to spread the CAZAC sequence generated by the random sequence generator over the determined currently unused subcarriers.

5. The eNodeB according to claim 1, wherein the random sequence generator is further configured to refresh the CAZAC sequence for each transmission time interval, TTI, of the LTE transmission.

6. An E-UTRAN comprising:
   at least two eNodeBs,
   wherein a first one of the at least two eNodeBs comprises:
   a mapping device configured to map a first information data stream to be transmitted on a first LTE transmission channel, the first LTE transmission channel having a first channel transmission bandwidth and at least one guard band adjacent to the channel transmission bandwidth, and configured to spread the first information data stream over a plurality of mutually orthogonal data subcarriers within the first channel transmission bandwidth;

a random sequence generator configured to generate a constant amplitude zero autocorrelation (CAZAC) sequence;
a guard band subcarrier controller configured to spread the CAZAC sequence generated by the random sequence generator over guard band subcarriers within the at least one guard band; and
an RF transmitting system configured to transmit the first information data stream over the data subcarriers in parallel to the CAZAC sequence over the guard band subcarriers,
wherein a second one of the at least two eNodeBs comprises:
a mapping device configured to map a second information data stream to be transmitted on a second LTE transmission channel, the second LTE transmission channel having a second channel transmission bandwidth and at least one guard band adjacent to the channel transmission bandwidth, and configured to spread the second information data stream over a plurality of mutually orthogonal data subcarriers within the second channel transmission bandwidth;
a random sequence generator configured to generate a constant amplitude zero autocorrelation (CAZAC) sequence;
a guard band subcarrier controller configured to spread the CAZAC sequence generated by the random sequence generator over guard band subcarriers within the at least one guard band; and
an RF transmitting system configured to transmit the second information data stream over the data subcarriers in parallel to the CAZAC sequence over the guard band subcarriers,
and wherein the first and second guard bands are located in a frequency gap between the first and second channel transmission bandwidth.

7. A method of using an E-UTRAN in an airborne vehicle, the method comprising:
receiving terrestrial communication signals within the airborne vehicle; and
masking the terrestrial communication signals within the airborne vehicle using the E-UTRAN, the E-UTRAN comprising:
at least two eNodeBs,
wherein a first one of the at least two eNodeBs comprises:
a mapping device configured to map a first information data stream to be transmitted on a first LTE transmission channel, the first LTE transmission channel having a first channel transmission bandwidth and at least one guard band adjacent to the channel transmission bandwidth, and configured to spread the first information data stream over a plurality of mutually orthogonal data subcarriers within the first channel transmission bandwidth;
a random sequence generator configured to generate a constant amplitude zero autocorrelation (CAZAC) sequence;
a guard band subcarrier controller configured to spread the CAZAC sequence generated by the random sequence generator over guard band subcarriers within the at least one guard band; and
an RF transmitting system configured to transmit the first information data stream over the data subcarriers in parallel to the CAZAC sequence over the guard band subcarriers,
wherein a second one of the at least two eNodeBs comprises:
a mapping device configured to map a second information data stream to be transmitted on a second LTE transmission channel, the second LTE transmission channel having a second channel transmission bandwidth and at least one guard band adjacent to the channel transmission bandwidth, and configured to spread the second information data stream over a plurality of mutually orthogonal data subcarriers within the second channel transmission bandwidth;
a random sequence generator configured to generate a constant amplitude zero autocorrelation (CAZAC) sequence;
a guard band subcarrier controller configured to spread the CAZAC sequence generated by the random sequence generator over guard band subcarriers within the at least one guard band; and
an RF transmitting system configured to transmit the second information data stream over the data subcarriers in parallel to the CAZAC sequence over the guard band subcarriers,
and wherein the first and second guard bands are located in a frequency gap between the first and second channel transmission bandwidth.

8. An airborne vehicle, comprising at least one eNodeB, the eNodeB comprising:
a mapping device configured to map a first information data stream to be transmitted on a first LTE transmission channel, the first LTE transmission channel having a first channel transmission bandwidth and at least one guard band adjacent to the channel transmission bandwidth, and configured to spread the first information data stream over a plurality of mutually orthogonal data subcarriers within the first channel transmission bandwidth;
a random sequence generator configured to generate a constant amplitude zero autocorrelation (CAZAC) sequence;
a guard band subcarrier controller configured to spread the CAZAC sequence generated by the random sequence generator over guard band subcarriers within the at least one guard band; and
an RF transmitting system configured to transmit the first information data stream over the data subcarriers in parallel to the CAZAC sequence over the guard band subcarriers.

* * * * *